US008599784B2

(12) United States Patent
Lim et al.

(10) Patent No.: US 8,599,784 B2
(45) Date of Patent: Dec. 3, 2013

(54) FEMTO BASE STATION AND METHOD FOR ALLOCATING RADIO RESOURCE THEREOF

(75) Inventors: Jae-Won Lim, Anyang (KR); Jang-Won Lee, Seoul (KR); Jeong-Ahn Kwong, Seoul (KR); Byung-Gook Kim, Seoul (KR)

(73) Assignees: LG Electronics Inc., Seoul (KR); Industry-Academic Cooperation Foundation, Yonsei University, Seoul (KR)

(*) Notice: Subject to any disclaimer, the term of this patent is extended or adjusted under 35 U.S.C. 154(b) by 116 days.

(21) Appl. No.: 13/381,641

(22) PCT Filed: Jun. 30, 2009

(86) PCT No.: PCT/KR2009/003556
§ 371 (c)(1),
(2), (4) Date: Feb. 8, 2012

(87) PCT Pub. No.: WO2011/002110
PCT Pub. Date: Jan. 6, 2011

(65) Prior Publication Data
US 2012/0127954 A1   May 24, 2012

(51) Int. Cl.
*H04W 4/00* (2009.01)
(52) U.S. Cl.
USPC .......................................... 370/329; 455/444

(58) Field of Classification Search
USPC ........ 370/310.2, 329, 332, 341; 455/444, 509
See application file for complete search history.

(56) References Cited

U.S. PATENT DOCUMENTS

| | | | |
|---|---|---|---|
| 6,138,024 A | 10/2000 | Evans et al. | |
| 6,405,048 B1 | 6/2002 | Haartsen | |
| 8,160,631 B2* | 4/2012 | Raghothaman et al. | 455/522 |
| 8,179,847 B2* | 5/2012 | Huber et al. | 370/329 |
| 2008/0085720 A1 | 4/2008 | Hirano et al. | |
| 2008/0305801 A1 | 12/2008 | Burgess et al. | |
| 2009/0046665 A1 | 2/2009 | Robson et al. | |
| 2009/0227263 A1* | 9/2009 | Agrawal et al. | 455/452.1 |
| 2009/0270107 A1* | 10/2009 | Lee et al. | 455/450 |
| 2011/0190003 A1* | 8/2011 | Hiltunen et al. | 455/452.1 |

* cited by examiner

*Primary Examiner* — Brenda H Pham
(74) *Attorney, Agent, or Firm* — Lee, Hong, Degerman, Kang & Waimey

(57) ABSTRACT

A method for allocating radio resource to one or more first UEs by a femto BS, includes: acquiring information about one or more second UEs which are located within a cell coverage of the femto BS but served by the macro BS; receiving a control channel from the macro BS; acquiring radio resource information allocated to the second UEs by the macro BS from the control channel; and allocating radio resource to the first UEs such that the allocated radio resource does not overlap with radio resource information allocated to the second UEs.

14 Claims, 13 Drawing Sheets

FEMTO BASE STATION AND METHOD FOR ALLOCATING RADIO RESOURCE THEREOF

CROSS-REFERENCE TO RELATED APPLICATIONS

This application is the National Stage filing under 35 U.S.C. 371 of International Application No. PCT/KR2009/003556, filed on Jun. 30, 2009, the contents of which are all incorporated by reference herein in its entirety.

TECHNICAL FIELD

The present invention relates to a mobile communication system and, more particularly, to a femto base station in a mobile communication system and a method for allocating radio resource thereof.

BACKGROUND ART

A wireless communication is extensively developed to provide various types of communication services such as voice, data, and the like. In general, a wireless communication system is a multiple access system supporting communication with multiple users by sharing available system resources (bandwidth, transmission power, etc.). The multiple access system includes a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, and the like.

The $2^{nd}$-generation mobile communication refers to transmission/reception voice data in a digital manner, which includes CDMA, GSM, and the like. As an advanced level of GSM, GPRS has been proposed to provide a packet switched data service based on the GSM system.

The $3^{rd}$-generation mobile communication refers to a scheme for transmitting and receiving image and data. A Third Generation Partnership Project (3GPP) has developed a mobile communication system (IMT-6000) and adopts WCDMA as a radio access technology (RAT). A scheme combining the IMT-6000 technology and the RAT, e.g., the WCDMA, is called universal mobile telecommunication system (UMTS). A UTRAN stands for a UMTS terrestrial radio access network.

The 3rd-generation mobile communication is evolving into 4th-generation mobile communication.

As the 4th-generation mobile communication technology, a long-term evolution network (LTE) technique under standardization by 3GPP and an IEEE 802.16 technique under standardization by IEEE have been proposed. The LTE uses a term of an evolved-UTRAN (E-UTRAN).

For the $4^{th}$-generation mobile communication technology, an orthogonal frequency division multiplexing (OFDM)/orthogonal frequency division multiple access (OFDMA) have been introduced. OFDM uses orthogonality between inverse fast Fourier transform (IFFT) and fast Fourier transform (FFT). A transmitter performs IFFT on data and transmits the same. A receiver performs FFT on a reception signal to restore the original data. The transmitter uses IFFT to combine a plurality of sub-carriers, and the receiver uses corresponding FFT to separate the plurality of sub-carriers.

Meanwhile, in the $3^{rd}$ or $4^{th}$-generation mobile communication system, attempts for increasing a cell capacity continues to support high capacity services such as multimedia contents, streaming, and the like, and bi-directional services. Namely, as various large capacity transmission techniques are required in line with the development of communications and the spread of multimedia technology, a method of allocating more frequency resources may be employed to increase radio capacity, but allocation of more frequency resources to multiple users with limited frequency resources has a limitation.

An approach of using a high frequency band and reducing a cell radius has been proposed to increase the cell capacity. The application of a cell with a relatively small cell radius such as a pico cell or the like can use a higher band than the frequency band used in the existing cellular system, having an advantage that more information can be transmitted, but also there is shortcomings in that more base stations should be installed in the same area, incurring more costs.

As one of approaches for increasing the cell capacity by using smaller cells, a femtocell has been proposed.

A femtocell refers to providing a small radio environment by installing a very small base station with low power consumption at homes or offices. The femtocell can enhance quality of service (QoS) by improving an indoor service available area and increasing capacity, and is expected to completely settle the next generation mobile communication system by providing data services.

Thus, research on the technique for a femto base station (BS) installed in a residential area or in offices is actively ongoing. A femto BS refers to a very small mobile communication base station used at homes or offices. The femto BS is connected to an internet protocol (IP) network provided at homes or offices and accesses a core network of a wireless communication system via the IP network to provide a radio communication service. A user may receive a service via an existing macro BS at outside of a room, and receive a service via the femto BS in a room. The femto BS improves an indoor coverage of the wireless communication by complementing the fact that the service of the existing macro BS is aggravated in a building. In addition, because the femto BS provides a service only to predetermined particular users, it can provide a high quality voice service and data service.

A method for allocating a frequency band of the femto BS disposed within a coverage of the macro BS includes a co-channel scheme, a partial co-channel scheme and a dedicated channel scheme. The co-channel scheme is allocating the same frequency band as that of the macro BS, as a frequency band of the femto BS. In this case, it is important to control transmission power of the femto BS to reduce interference that may be possibly generated as the macro BS and the femto BS use the same frequency band. The partial co-channel scheme is allocating a partial frequency band of the macro BS as a co-channel which is to be used together with the femto BS. In this scheme, if interference occurs in the co-channel, a user of the macro BS may receive a service via a frequency band other than the co-channel, thus reducing the interference. The dedicated-channel scheme is allowing the macro BS and the femto BS use different frequency bands, significantly reducing interference between the macro BS and the femto BS.

The femto BS is a small base station that a user purchases and installs it in his office or home, so a radio communication provider cannot restrain disposition of the femto base station. In general, distributions of femto BSs is not regular and unpredictable. Thus, a method for reducing interference between arbitrarily disposed femto BSs is required.

In order to reduce interference between femto BSs, transmission power of femto BSs may be limited, but his method has a problem in that the coverage of each femto BS is reduced. Using of different frequency bands between adjacent femto BSs can significantly reduce interference between the femto BSs and the coverage of each femto BS can be guaranteed. Namely, if each femto BS uses a different frequency band and uses a maximum frequency resource, each femto BS could use a high frequency efficiency.

Thus, a method for reducing interference between femto BSs and improving a frequency efficiency is required.

In this respect, a reduction in the cell radius may lead to dense base stations in a particular area, and because of unnecessary overlap installations of base stations, interference is generated, radio resources are ineffectively used, and a system performance is degraded.

In particular, in the femtocell cellular system, a femto BS can be arbitrarily installed by a user, and such installation of femto BSs possibly causes an overcrowded femto BSs.

In the related art as described above, an installation position of a femto BS is selected by each user, and the femto BS has a smaller coverage compared with a macro-base station and provides a service to a smaller number of determined users.

Thus, the location distribution of users much affect the interference relationship between femto BSs. Unnecessary overlap installations and overcrowded installations may be caused, and in a residual area or offices are crowded, the distance between installed femto BSs is narrow.

DISCLOSURE OF INVENTION

Technical Solution

Therefore, an object of the present invention is to reduce the overcrowded phenomenon of femto base stations and interference between cells of a femto base station.

Another object of the present invention is to continuously provide a satisfied level of quality of service (QoS) to terminals (i.e., user equipments (UEs)), restrain interference, and effectively use radio resources.

Another object of the present invention is to provide resource allocation method for reducing interference between a femto BS and a macro BS.

To achieve these and other advantages and in accordance with the purpose of the present invention, as embodied and broadly described herein, there is provided a method for allocating radio resource to one or more first UEs by a femto BS, including: acquiring information about one or more second UEs which are located within a cell coverage of the femto BS but served by the macro BS; receiving a control channel from the macro BS; acquiring radio resource information allocated to the second UEs by the macro BS from the control channel; and allocating radio resource to the first UEs such that the allocated radio resource does not overlap with radio resource information allocated to the second UEs.

The acquiring of the information about the second UEs may include: receiving control signals transmitted from the second UEs; and acquiring information about the second UEs by using the control signals.

The acquiring of the information about the second UEs may include: reading the positions of the control signals on the radio frame; transmitting the position information on the radio frame to a network entity; and receiving information about the second UEs corresponding to the positions on the radio frame from the network entity.

The network entity may include one or more of a core network, a radio network controller (RNC), a femto gateway, a mobility management entity (MME), and a serving gateway (S-GW).

The control signals may include one or more of a sounding reference signal (SRS), a channel quality indicator (CQI), CQICH, ACKCH, a ranging channel, a PUCCH (Physical Uplink Control Channel)), and a control channel.

The control channel may include one or more of a PDCCH (Physical Downlink Control Channel), DL-MAP, and UL-MAP.

The acquiring of the radio resource information may include: decoding the control channel by using the information about the second UEs.

In allocating radio resource to the first UEs, one or more of uplink and downlink radio resources may be allocated to the first UEs.

The allocating of radio resource to the first UEs may include: transmitting a control channel including information about the radio resource allocated to the first UEs.

The control channel may be separated by certain slots, certain subframes or certain frames from a control channel of the macro BS, and transmitted.

To achieve these and other advantages and in accordance with the purpose of the present invention, as embodied and broadly described herein, there is also provided a femto BS located in a cell coverage of a macro BS, including: a transmission/reception unit configured to acquire information about one or more second UEs which are located within a cell coverage of the femto BS but served by the macro BS, receive a control channel from the macro BS, and acquire radio resource information allocated to the second UEs by the macro BS from the control channel; and a controller configured to allocate radio resource to the first UEs such that the allocated radio resource does not overlap with radio resource information allocated to the second UEs.

According to the present invention, an overcrowded phenomenon of femto base stations or interference between cells of femto base stations can be reduced. Also, a satisfied level of QoS can be provided to UEs, an interference can be restrained, and radio resources can be more effectively used. In addition, resource is allocated by reducing interference between the femto BS and the macro BS.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
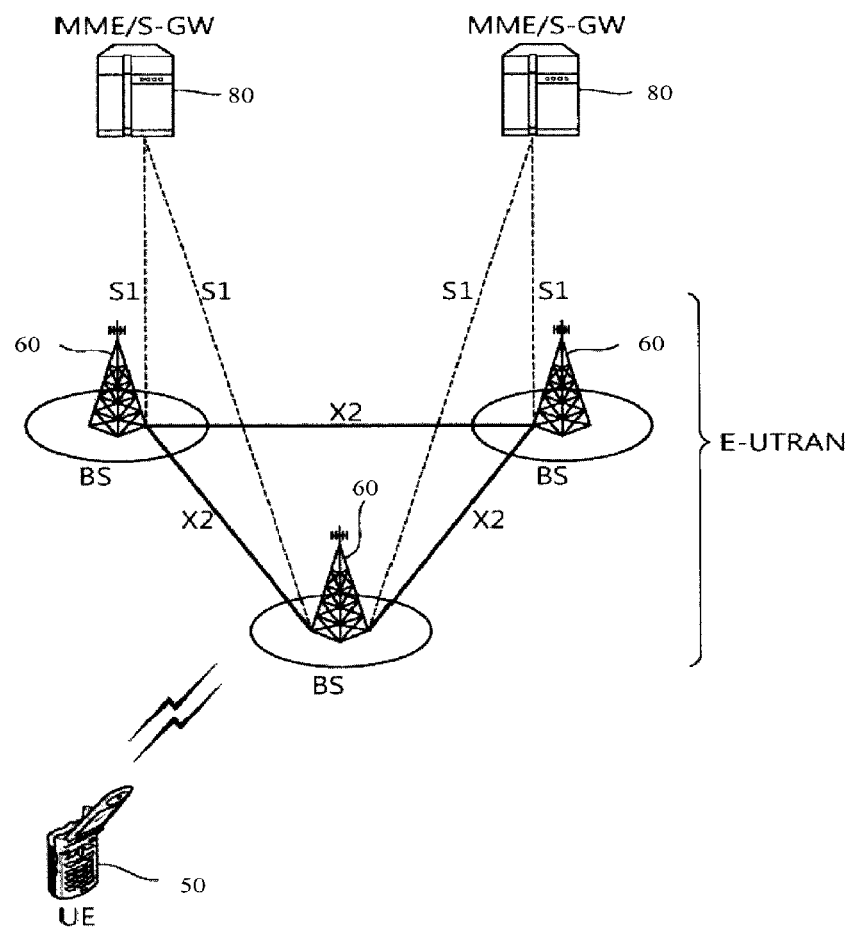
FIG. 1 illustrates a wireless communication system.

Reference will now be made in detail to the preferred embodiments of the present invention, examples of which are illustrated in the accompanying drawings.

The present invention is applied to a femto cell. However, without being limited thereto, the present invention can be applicable to any communication systems and methods to which the technical idea of the present invention is applied.

The technical terms in the description of the present invention are used for explaining particular embodiments and it should be understood that they do not limit the present invention. Unless otherwise defined, all terms used herein have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application. Also, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

The terms "a" and "an" are defined as one or more unless explicitly stated otherwise herein. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term of terminal is in use, but the terminal may be also called user equipment (UE), mobile equipment (ME), or mobile station (MS). In addition, the UE may be a mobile device having a communication function such as mobile phones, personal digital assistants (PDAs), smart phones, notebook computers, and the like, or may be a device that cannot be carried around such as personal computers (PCs) or a vehicle-mounted device.

The exemplary embodiments of the present invention will now be described in detail with reference to the accompanying drawings.

The following technique can be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as radio technology such as UTRA (Universal Terrestrial Radio Access) or CDMA6000. The TDMA may be implemented as radio technology such as GSM (Global System for Mobile communications)/GPRS (General Packet Radio Service)/EDGE (Enhanced Data Rates for GSM Evolution). OFDMA may be implemented as radio technology such as IEEE 802.11 (Wi-Fi), IEEE 802.16 (WiMAX), IEEE 802-60, E-UTRA (Evolved UTRA), and the like. UTRA is a part of UMTS (Universal Mobile Telecommunications System). 3GPP (3rd Generation Partnership Project) LTE (long term evolution) is a part of E-UMTS (Evolved UMTS) using E-UTRA, which employs OFDMA for downlink and SC-FDMA for uplink.

For clarification, the 3GPP LTE will be described but the technical idea of the present invention is not meant to be limited thereto.

Hereinbelow, downlink refers to communication from a BS to a UE, and uplink refers to communication from the UE to the BS. In the downlink, a transmitter may be a part of the BS, and a receiver may be a part of the UE. In the uplink, a transmitter may be a part of the UE, and a receiver may be a part of the BS.

The exemplary embodiments of the present invention will now be described with reference to the accompanying drawings.

FIG. 1 illustrates a wireless communication system. The wireless communication system illustrated in FIG. 1 may have a network structure of an evolved-universal mobile telecommunications system (E-UMTS). The E-UMTS system may be a long terminal evolution (LTE) system. The wireless communication system is widely deployed to provide a variety of communication services such as communication of voice, packet data, etc.

With reference to FIG. 1, the E-UTRAN includes base stations (BSs) 60 each providing a control plane and a user plane.

A user equipment (UE) 50 may be fixed or mobile, and may be referred to by other names such as mobile station (MS), user terminal (UT), subscriber station (SS), wireless device, etc. The BS 60 generally refers to a fixed station that communicates with the UE 50 and may be called by other names such as evolved-node-B (eNB), base transceiver system (BTS), access point (AP), etc.

A single BS 60 may provide a service with respect to at least one cell. A cell is an area to which the BS 60 provides a communication service. An interface for transmitting user traffic or control traffic may be used between BSs 60. Hereinbelow, downlink refers to communication from the BSs 60 to the UE 50, and uplink refers to communication from the UE 50 to the BSs 60.

The BSs 60 may be connected via an X2 interface. The BSs 60 are connected to evolved packet cores (EPCs), specifically, to mobility management entity (MME)/serving gateways (S-GWs) 80, via S1 interfaces. The S1 interfaces support any-to-many relations between the BSs 60 and the MME/S-GWs 80.

Figure 2:
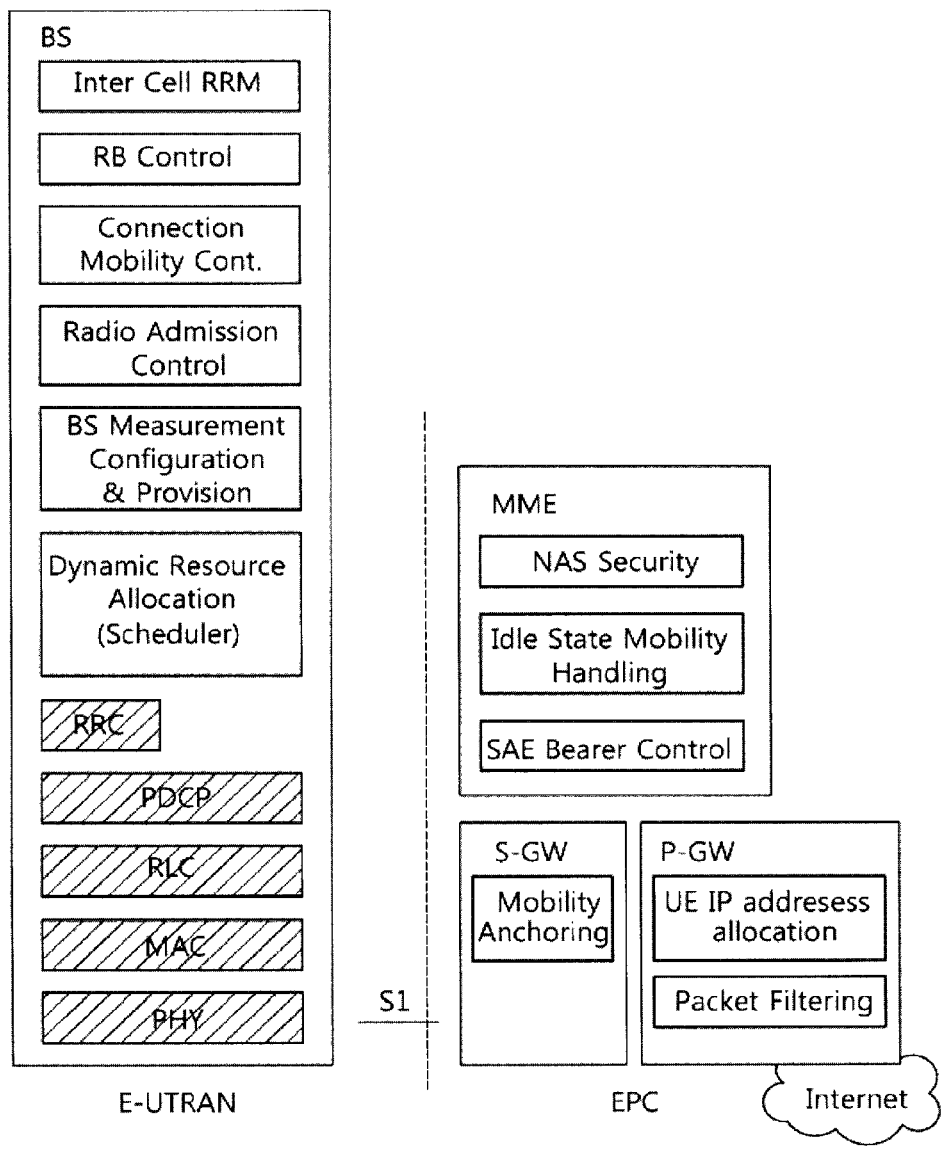
FIG. 2 is a schematic block diagram illustrating a functional split between an E-UTRAN and an EPC.

FIG. 2 is a schematic block diagram illustrating a functional split between an E-UTRAN and an EPC. The shaded boxes indicate radio protocol layers, and non-shaded boxes indicate functional entities of the control plane.

With reference to FIG. 2, the BSs perform the following functions: (1) a radio resource management (RRM) function such as radio bearer control, radio admission control, connection mobility control, dynamic resource allocation to UEs, and the like; (2) Internet protocol (IP) header compression and encryption of a user data stream; (3) routing of user plane data to S-GW; (4) scheduling and transmission of a paging message; (5) scheduling and transmission of broadcast information; and (6) measurement for mobility and scheduling and setting a measurement report.

An MME performs the following functions: (1) non-access stratum (NAS) signaling; (2) NAS signaling security; (3) idle mode UE reachability; (4) tracking area list management; (5) roaming; (6); authentication.

An S-GW performs the following functions: (1) mobility anchoring; (2) lawful interception.

A P-GW performs the following functions: (1) UE Internet protocol (IP) allocation; (2) packet filtering.

Figure 3:
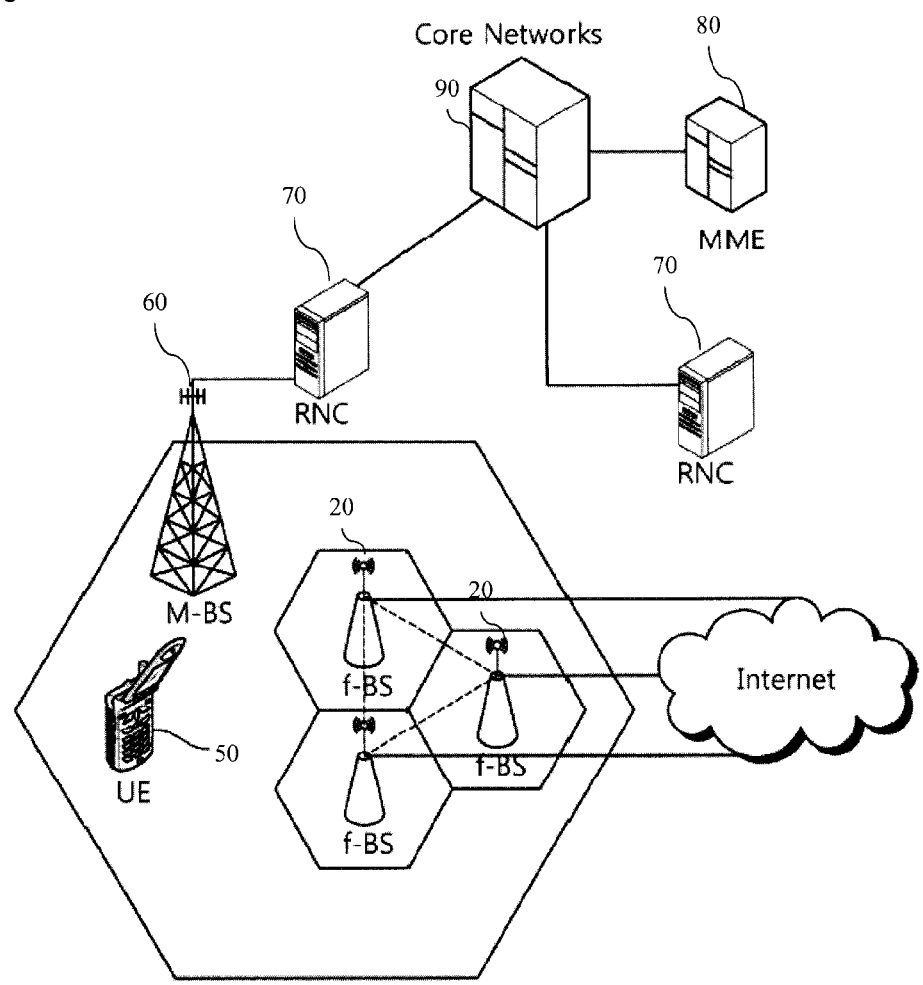
FIGS. 3 and 4 illustrate a femto cell system.
Figure 4:
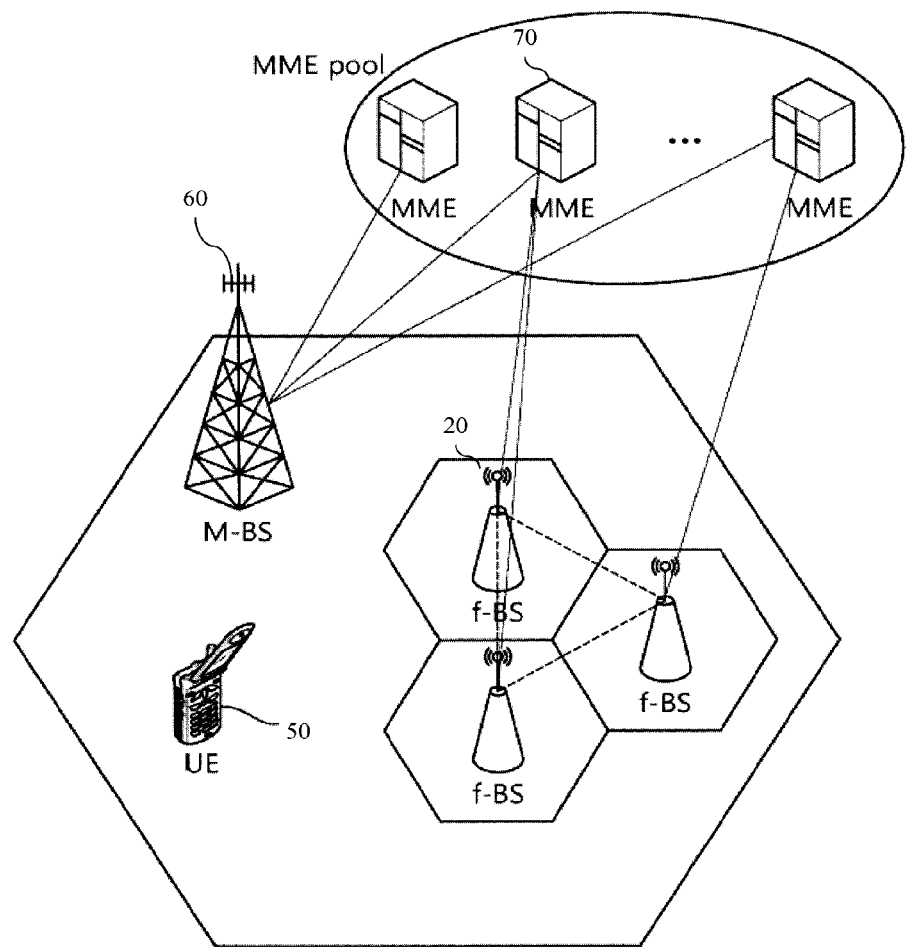

FIGS. 3 and 4 illustrate a femto cell system.

A handover method according to an exemplary embodiment of the present invention includes a general multi-cell environment, which, thus, can be applicable to a femto cell cellular system including femto base stations (f-BSs), small base stations, which are closely distributed as users installs them, respectively, in a particular area, and user equipments (UEs).

The femto cell cellular system may include a macro base station (M-BS) providing a wide coverage and a plurality of femtocell base stations (f-BSs) installed base on users. As shown in FIG. 3, the f-BSs and a core network may be connected via a femtocell network controller (FNC). The f-BSs may be connected to the M-BS via the FNC, the core network and a radio network controller (RNC). Or, as shown in FIG. 4, the f-BSs may be directly connected to an MME in an MME pool so as to be connected to the core network.

Each f-BS is connected to the FNC via the Internet to provide a service to previously registered limited users (i.e., a closed subscriber group (CSG)) under the control of the FNC. UEs measure signals of neighboring cells and transfers the same to an f-BS corresponding to its serving f-BS. The f-BS recognizes and manages the presence of a neighboring cell by using the cell measurement result received from the UE.

The f-BSs exchange information via a direct link or an indirect link by way of the FNC. The M-BSs may exchange information via the FNC, the RNC or the MME.

Because the f-BSs are installed by users, they may be unnecessarily installed in an overlap manner within a narrow area or closely installed. In particular, in a residence area or in an office crowded area, the space between f-BSs is narrow, resulting in that service coverages of the f-BSs overlap. Then, interference occurs between the femtocell cellular systems using radio resources of the same frequency band, and the system capacity is reduced.

In this respect, however, if the central FNC performs controlling on the crowded f-BSs, because it must control numerous f-BSs, increasing the operation costs, and the controlling is very complicated to result in an ineffective operation of the system.

Figure 5:
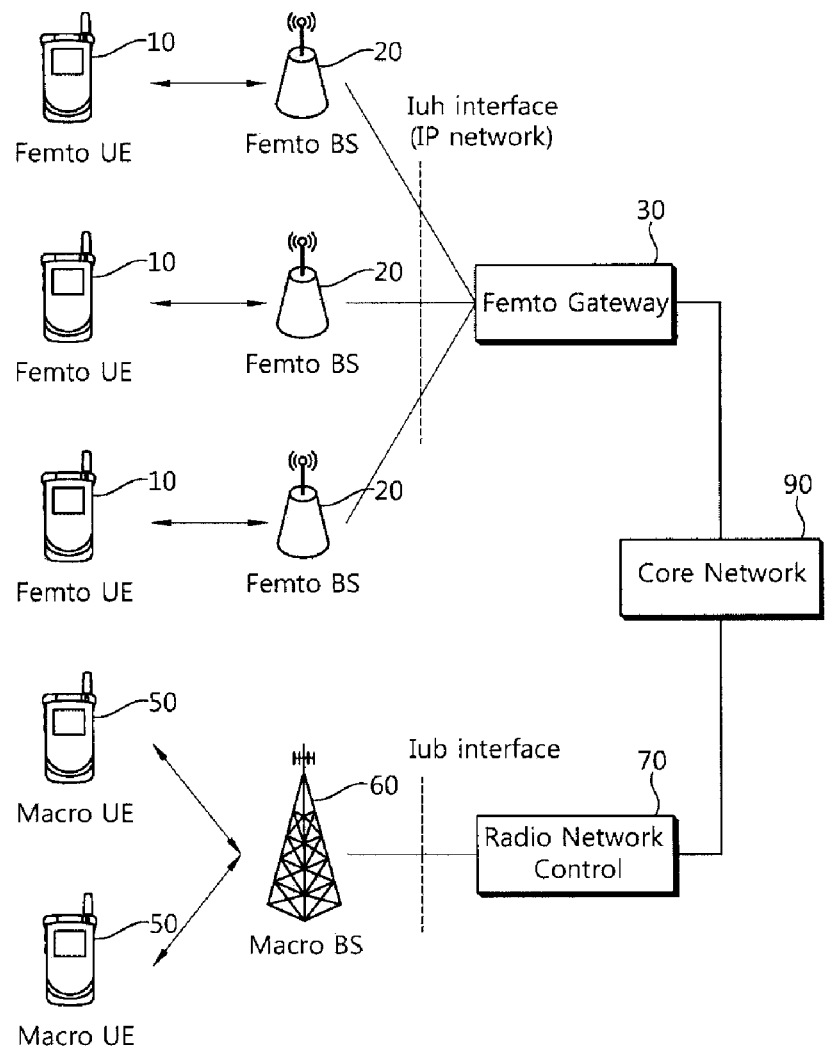
FIG. 5 illustrates a wireless communication system including femto base stations (BSs)

FIG. 5 illustrates a wireless communication system including femto base stations (BSs).

With reference to FIG. 5, BSs included in the wireless communciatoin system may be discriminated into the femto BSs 20 and the macro BS 60 according to a cell coverage or a disposition method.

The coverage of the femto BSs 20 is smaller than that of the macro BS 60. The entirety or a portion of the coverage of the femto BSs 20 may overlap with the coverage of the macro BS 60. The femto BS 20 may be called by other names such as femto-cell, home node-B, closed subscriber group (CSG) cell, and the like.

The femto BS 20 is connected to a femto gateway 30 via an Iuh interface. The Iuh interface refers to an interface between the femto BS 20 and the femto gateway 30 via an Internet protocol (IP) network.

The femto gateway 30 is an entity that manages at least one femto BS 20. The femto gateway 30 may perform a registration, authentication and security procedure of the femto BS 20 so that the femto BS 20 can be connected to a core network 90 of the wireless communication system.

Discriminated from the femto-cell, the macro BS 60 may be called a macro-cell. The macro BS 60 is connected to a radio network control (RNC) 70 via an Iub interface. The RNC 70 is an entity that manages at least one macro BS 60, which connects the macro BS 60 to the core network 90. The macro BS 60 may be connected to the core network 90 by a dedicated line, while the femto BS 20 may be connected to the core network 90 via the IP network.

A UE connected to the femto BS 20 is called a femto UE 10, and a UE connected to the macro BS 60 is called a macro UE 50. It is obvious for the skilled person in the art that the femto UE 10 may be a macro UE 60 through handover to the macro BS 60, and the macro UE 50 may be a femto UE 10 through handover to the femto BS 20.

Unlike the macro BS 60, the cells of the femto BSs 20 are irregular and unpredictable, so interference may occur in various situations. Table 1 below shows an interference scenario by situation

TABLE 1

| No | Aggresor | Victim |
|---|---|---|
| 1 | UE attached to femto BS | Macro BS uplink |
| 2 | Femto BS | Macro BS downlink |
| 3 | UE attached to macro BS | Femto BS uplink |
| 4 | Macro BS | Femto BS downlink |
| 5 | UE attached to femto BS | Femto BS uplink |
| 6 | Femto BS | Femto BS downlink |
| 7 | UE attached to femto BS and/or femto BS | Other system |
| 8 | Other system | UE attached to femto BS and/or femto BS |

Such interference may occur in various situations.

Thus, in order to effectively use the femto BSs 20, a method for reducing such interference in various situations is required.

Figure 6:
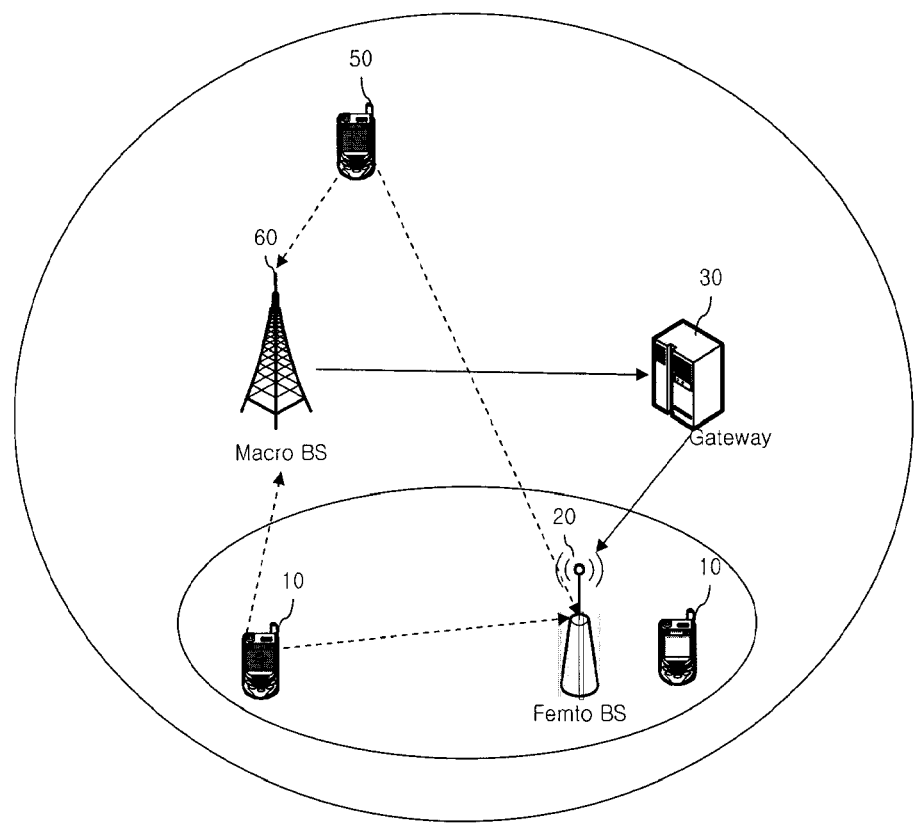
FIG. 6 illustrates a system for explaining a first exemplary embodiment of the present invention.
Figure 6:
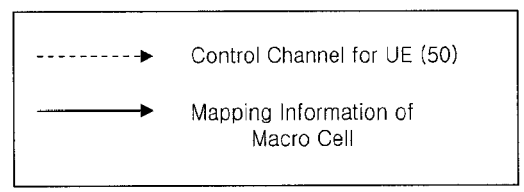
Figure 7:
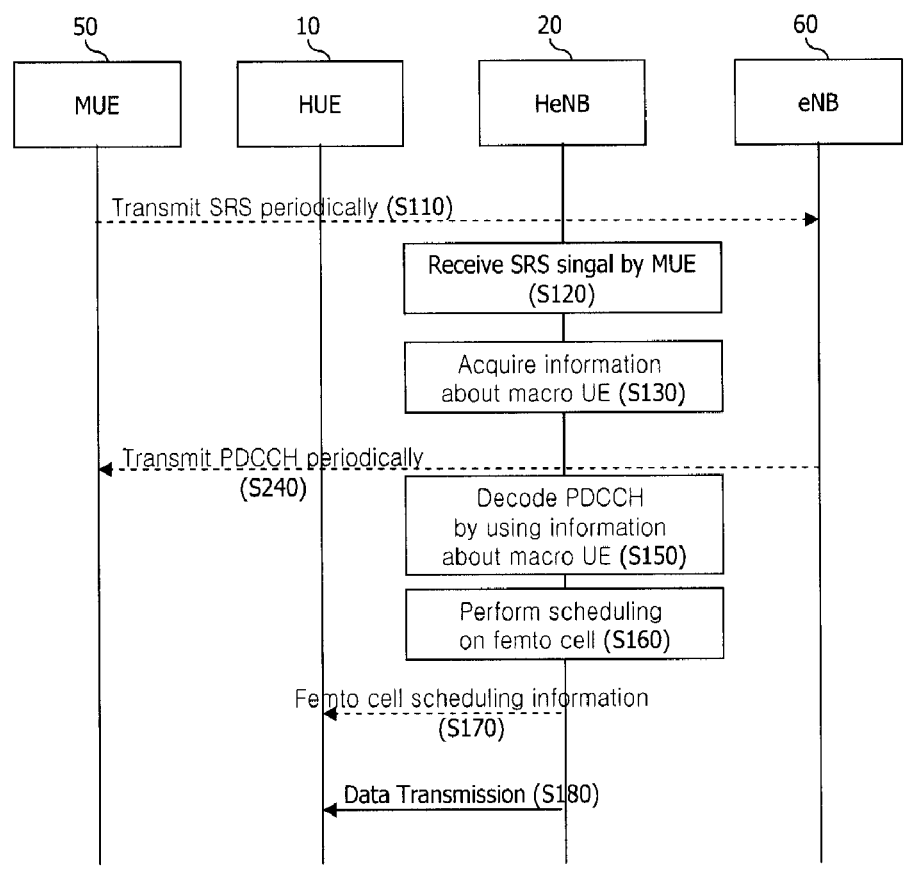
FIG. 7 is a signal flow chart illustrating the procedure of allocating, by a femto BS, resource by avoiding interference with a macro BS according to the first exemplary embodiment of the present invention.
Figure 8:
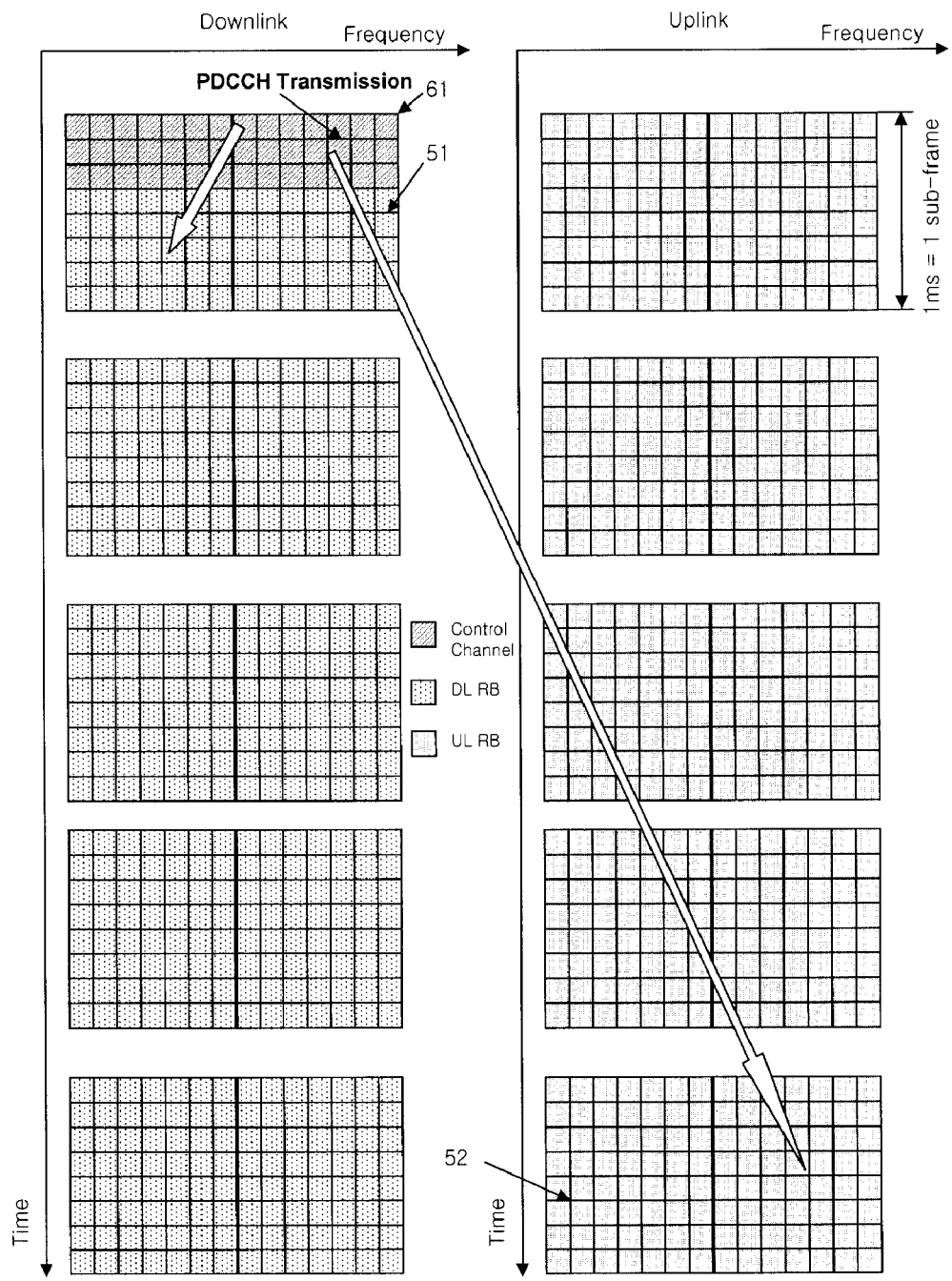
FIG. 8 illustrates a radio frame structure used according to the first exemplary embodiment of the present invention.

FIG. 6 illustrates a system for explaining a first exemplary embodiment of the present invention, FIG. 7 is a signal flow chart illustrating the procedure of allocating, by a femto BS, resource by avoiding interference with a macro BS according to the first exemplary embodiment of the present invention, and FIG. 8 illustrates a radio frame structure used according to the first exemplary embodiment of the present invention.

As shown in FIG. 6, it is obvious to the skilled person in the art that the femto UE 10 can be a macro UE 50 by performing handover to the macro BS 60, and the macro UE 50 can be a femto UE 10 by performing handover to the femto BS 20.

In FIG. 6, it is assumed that the femto BS 20 uses the same frequency band as the macro BS 60. Thus, signals transmitted and received between the macro UE 50 and the macro BS 60 cause an interference to the radio resource of the femto BS 20. in addition, the signals transmitted and received between the femto UE 10 and the femto BS 20 cause an interference to the radio resource of the macro BS 60.

Thus, a method for reducing the interference between the femto BS 20 and the macro BS 60 is required.

To this end, the femto gateway 30 or the MME in core network is connected to the femto BS 20 and controls resource allocation of the femto BS 20.

In this case, scheduling for the macro BS 30 to allocate its radio resource is performed within a short time, so it is very difficult to simultaneously schedule radio resource of the femto BS 20 as well as radio resource of the macro BS 30. In particular, in the next-generation mobile communication system such as the LTE, such scheduling is performed within a very short time, aggravating the above-mentioned difficulty.

Thus, according to the first exemplary embodiment of the present invention, a method in which the femto BS 20 acquires information regarding radio resource allocated by the macro BS 30 to the macro UE 50 and allocates its radio resource such that it does not overlap with the radio resource of the macro BS 30, to thereby reduce interference, is proposed.

In order for the femto BS 20 to acquire the information regarding the radio resource allocated by the macro BS 30 to the macro UE 50, the femto BS 20 should recognize the macro UE 50 and acquire information about the macro UE 50. In order to acquire information about the macro UE 50, the first exemplary embodiment of the present invention uses a control signal transmitted by the macro UE 50. Namely, the femto BS 20 receives a control signal transmitted by the macro UE 50, recognizes that the macro UE 50 is located to be close to the femto BS 20 according to the received control signal, and recognizes the macro UE 50 based on the received control signal. The femto BS 20 acquires information about radio resource allocated to the macro UE 50 by the macro BS 60. And, the femto BS 20 allocates its radio resource such that it does not overlap with the radio resource allocated to the macro UE 50.

This will now be described in detail with reference to FIG. 7.

1) First, the macro UE (MUE) 50 transmits a control signal to the macro BS (eNB) 60 (S110). The control signal includes a sounding reference signal (SRS), a channel quality indicator (CQI), ACK/NACK, resource allocation request, a PUCCH (Physical Uplink Control Channel), and other control channels. The control signal may include any other signals.

2) The femto BS 20 listens to the control signal transmitted from the macro UE 50 (S120), and determines whether or not the macro UE 50 is located in the vicinity of the femto BS 20.

Whether or not the macro BS 50 is located nearby may be determined according to whether the strength of the control signal exceeds a certain threshold value. Namely, if the strength of the control signal of the macro UE 50 is larger than a certain threshold value, it means that the macro UE 50 is located as closely as it causes an interference to the femto BS 20.

3) Subsequently, the femto BS 20 acquires information about the macro UE located in the vicinity of the femto BS 20, e.g., identification information, and makes a list (S130).

In order to acquire the information about the macro UE 50, e.g., the identification in-formation, in the first exemplary embodiment of the present invention, among the above-mentioned control signals, the SRS transmitted at regular periods is mainly used, and also the CQI is used as necessary. In the next-generation communication system such as LTE, channel estimation on uplink of each UE is generally performed only on a frequency band at which data has been transmitted. Thus, SRS, which is used to supplement this, is a control signal transmitted by each UE at a regular period with respect to every band, and also may be used to match synchronization of unlink of each UE. The SRS is transmitted at periods of 2, 5, 10, 20, 40, 80, 160, and 320 ms (subframe). Such periods are generally determined by a BS. Because the SRS signal is transmitted by each UE to the macro BS periodically at a predetermined position in a frame at a relatively short period, it is appropriate to be used in the present invention.

However, the control signal such as the SRS signal does not include identification information of the macro UE 50. In general, each macro UE transmits its control signal, e.g., the SRS signal, at a particular time or at a predetermined particular position on a radio frame. Thus, the femto BS 20 recognizes at which time the control signal of the macro UE 50 has been received or where the control signal is positioned on the frame, and uses the time or the frame to acquire information on the terminal. There are two methods to acquire the information on the terminal.

First, the femto BS 20 receives from the gateway 30 or the core network information on a transmission period of a control signal and where the control signal is located on a radio frame. And, if the femto BS 20 receives a control signal from the macro UE, the femto BS 20 compare the received information with the control signal from the macro UE.

Second, the femto BS 20 receives a control signal which is periodically transmitted by the macro UE to the macro BS, and the femto BS 20 check the period of the control signal and where the control signal is located on a radio frame. And, the femto BS 20 transmits information on the period and the location to the gateway 30 or the core network to acquire information on the macro UE.

Then, the gateway 30 or the core network transfers the information about the macro UE 50 to the femto BS 10 based on the time information or the position information on the frame. Namely, because the macro BS 60 previously schedule the position on the time at which each macro UE should transmit the control signal or the position on the frame, it has information about mapping of the position on the time and or on the frame to each UE and provides the same to the gateway 30 or the core network. Then, the gateway 30 or the core network transfers the information about the macro UE 50 to the femto BS 10 based on the mapping information.

4) Meanwhile, in order to provide information regarding the radio resource allocated to each macro UE 50, the macro BS 60 transmits a control channel, e.g., a physical downlink control channel (PDCCH) (S140). It is illustrated in FIG. 8.

FIG. 8 illustrates radio resource (left portion shows downlink and right portion shows uplink) in the LTE system. As for the radio resource illustrated in FIG. 8, a vertical axis indicates time and a horizontal axis indicates frequency. Subframes in units of 1 ms are shown in the vertical axis. The subframes include a plurality of slots. A plurality of subframes constitute a single frame.

Information about downlink radio resource 51 that the macro BS 60 has allocated to each macro UE 50 is included in the PDCCH and transmitted. The PDCCH including the information about the downlink radio resource 51 is included on one or more (e.g., one to three) symbols 61 at every 1 ms, namely, at every subframe. Information about uplink radio resource 52 that the macro BS 60 has allocated to each macro UE 50 may be included in the PDCCH and transmitted.

Accordingly, the macro UE 50 decodes the PDCCH to acquire the information about the downlink radio resource 51 and the uplink radio resource 52 which have been allocated to the macro UE 50, and transmits/receives data based on the information.

5) The femto BS 20 receives the control channel from the macro BS 60, and decodes the control channel by using the acquired information about the macro UE 50, e.g., the identification information (S150).

The femto BS 20 checks whether or not radio resource of the macro UE 50 causes an interference with that of the femto BS 20 through the decoded control channel, e.g., the PDCCH.

Namely, the femto BS 20 decodes the PDCCH to acquire information about the downlink radio resource 51 and the uplink radio resource 52 allocated to the macro UE 50. At this time, in order to decode the PDCCH, the acquired information about the macro UE 50, e.g., the identification information, is used.

Figure 9:
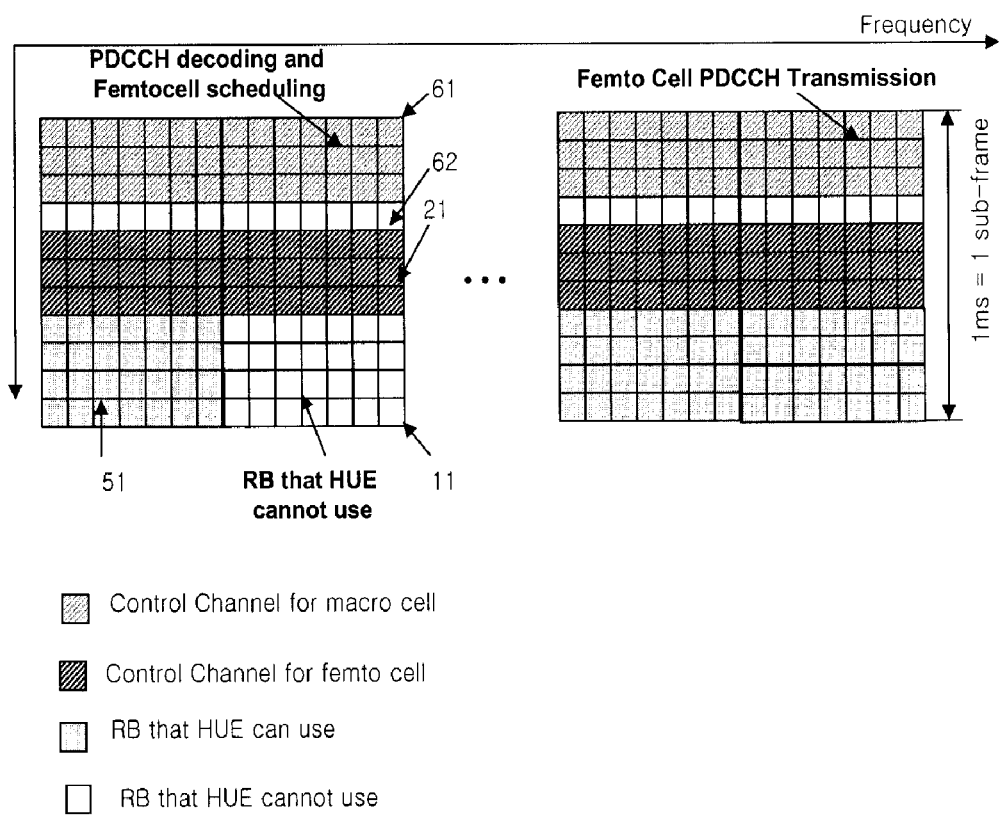
FIG. 9 illustrates femto BS's allocation of downlink by avoiding interference with the macro BS according to the first exemplary embodiment of the present invention.

6) The femto BS 20 performs scheduling such that the radio resource of the macro UE 50 does not overlap with that of the femto BS 20 (S160). Namely, when the femto BS 20 allocates its resource to one or more femto UEs 10 to which it provides a service, the femto BS 20 allocates radio resource such that it does not cause an interference with the downlink radio resource 51 an the uplink radio resource 52 of the macro UE 50. In this case, the radio resource include radio resource with respect to uplink from the femto UE 10 to the femto BS 20 and radio resource with respect to downlink from the femto BS 20 to the femto UE 10. Allocation of the radio resource with respect to the downlink is illustrated in FIG. 9.

7) The femto BS 20 transmits information about the allocated radio resource to the femto UE 10 via the control channel (S170). In this case, the control channel may include, for example, the PDCCH.

8) Subsequently, the femto BS 20 transmits data to the femto UE 10 via the allocated radio resource (S180).

The allocation of radio resource with respect to the downlink by the femto BS 20 will now be described in detail with reference to FIG. 9.

FIG. 9 illustrates femto BS's allocation of downlink by avoiding interference with the macro BS according to the first exemplary embodiment of the present invention.

The radio resource illustrated in FIG. 9 indicates downlink, in which a vertical axis indicates time and a horizontal axis indicates frequency.

As stated above, the PDCCH including information about the downlink radio resource 51 is included on one or more (e.g., one to three) symbols 61 at every 1 ms, namely, at every subframe. Namely, the downlink radio resource allocated by the macro BS 60 to the macro UE 50 varies for every subframe. Thus, in order to avoid interference with the macro BS 60, the femto BS 10 also should allocate its downlink radio at every subframe. As a result, the femto BS 20 should decode the PDCCH from the macro BS 60 and finish allocation of its radio resource within 1 ms, namely, within a single subframe time. It is noted that a location of frame where the femto BS transmits PDCCH is variable according to channel status and capability of the femto BS.

In this case, the PDCCH is transmitted on one or more (one to three) symbols 61, and at least one symbol time 62 is required for the femto BS 10 to decode the PDCCH, so the control channel, e.g., the PDCCH, including the information about the downlink radio resource 11 which has been allocated by the femto BS 20 may start from the fifth symbol 21 in the subframe.

In this case, as illustrated, the femto BS 10 allocates its radio resource 11 such that it does not overlap with the downlink radio resource 51 which has been allocated by the macro BS 60.

The femto BS 10 receives the PDCCH included in the slots 21 on the subframe, acquires the information about the downlink radio resource 11 which has been allocated by the femto BS 20, and receives the downlink data on the downlink radio resource 11.

Figure 10:
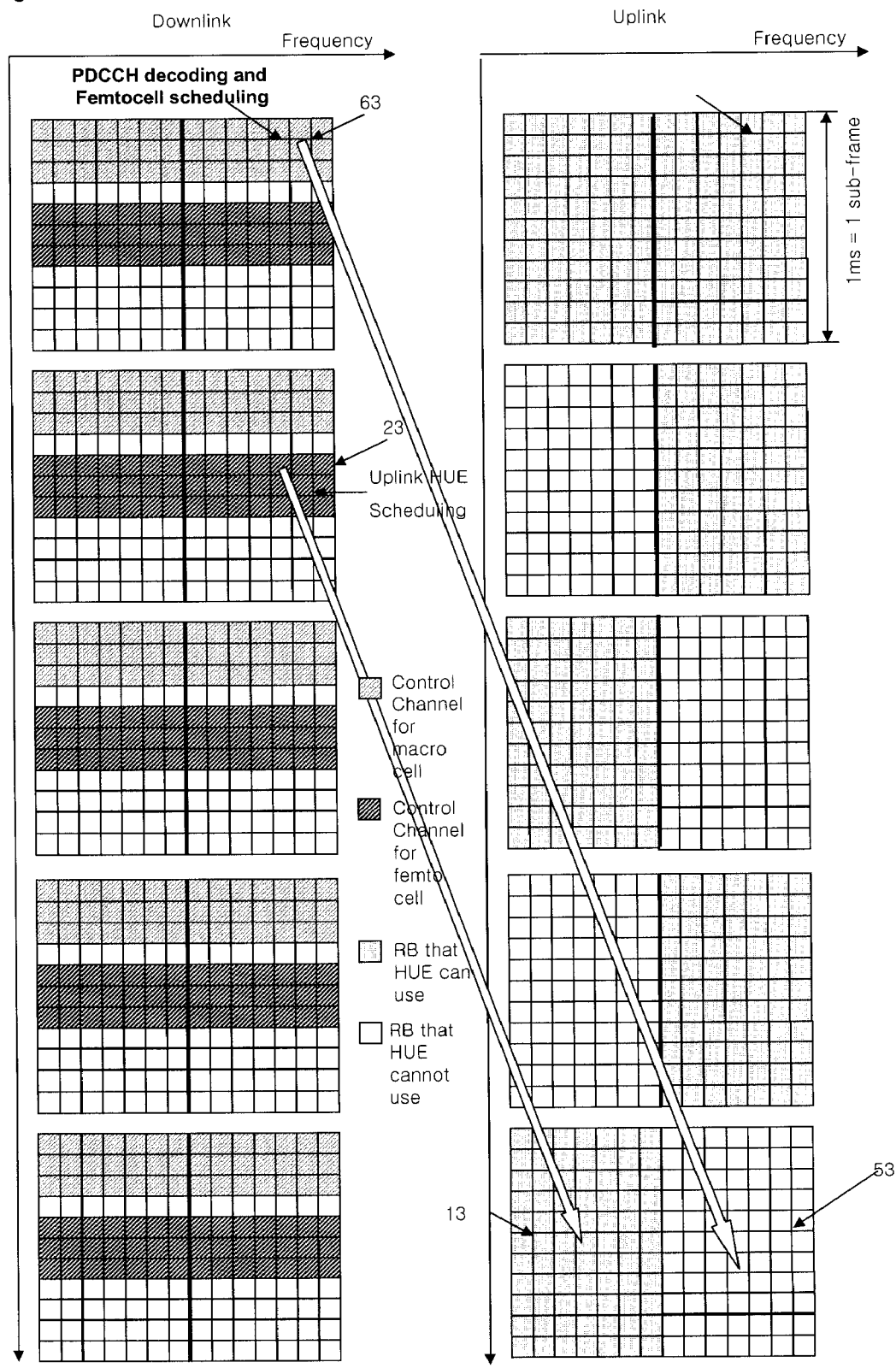
FIG. 10 illustrates femto BS's allocation of uplink by avoiding interference with the macro BS according to the first exemplary embodiment of the present invention.

FIG. 10 illustrates femto BS's allocation of uplink by avoiding interference with the macro BS according to the first exemplary embodiment of the present invention.

The radio resource as illustrated in FIG. 10 indicate downlink and uplink radio resource, in which a vertical indicates time and a horizontal axis indicates frequency.

As mentioned above, the PDCCH including the information about the downlink radio resource 51 is included on one or more (e.g., one to three) symbols 61 at each 1 ms, namely, at every subframe.

However, the macro BS 50 transmits the PDCCH including the uplink radio resource information on the nth subframe, on the (n-k)th subframe. Thus, unlike the case with reference to FIG. 9, allocation of uplink resource by the femto BS 20 does not need to be performed in units of each subframe. FIG. 10 illustrates that allocation of uplink resource is performed on 4th sub-frame according to LTE technology.

Thus, in FIG. 10, when the femto BS 20 receives the PDCCH including the information about the uplink radio resource 53, which has been allocated by the macro BS 50, on particular slots 63 of a subframe, it allocates its uplink radio resource 13 such that the uplink radio resource 13 does not overlap with the uplink radio resource 53 which has been allocated by the macro BS 50, and transmits the control channel, e.g., the PDCCH, including the information about the allocated uplink radio resource 13 on particular slots 23 of the subsequent subframe. Namely, the femto BS 20 transmits the PDCCH including the information about the allocated uplink radio resource 13 on the (n-k+1)th subframe.

Then, the femto UE 10 receives the PDCCH included on the particular slots 23 of the (n-k+1)th subframe and decodes the same. And then, the femto UE 10 transmits data to the femto BS 20 by using the uplink radio resource 13 which has been allocated to the femto BS 20.

Figure 11:
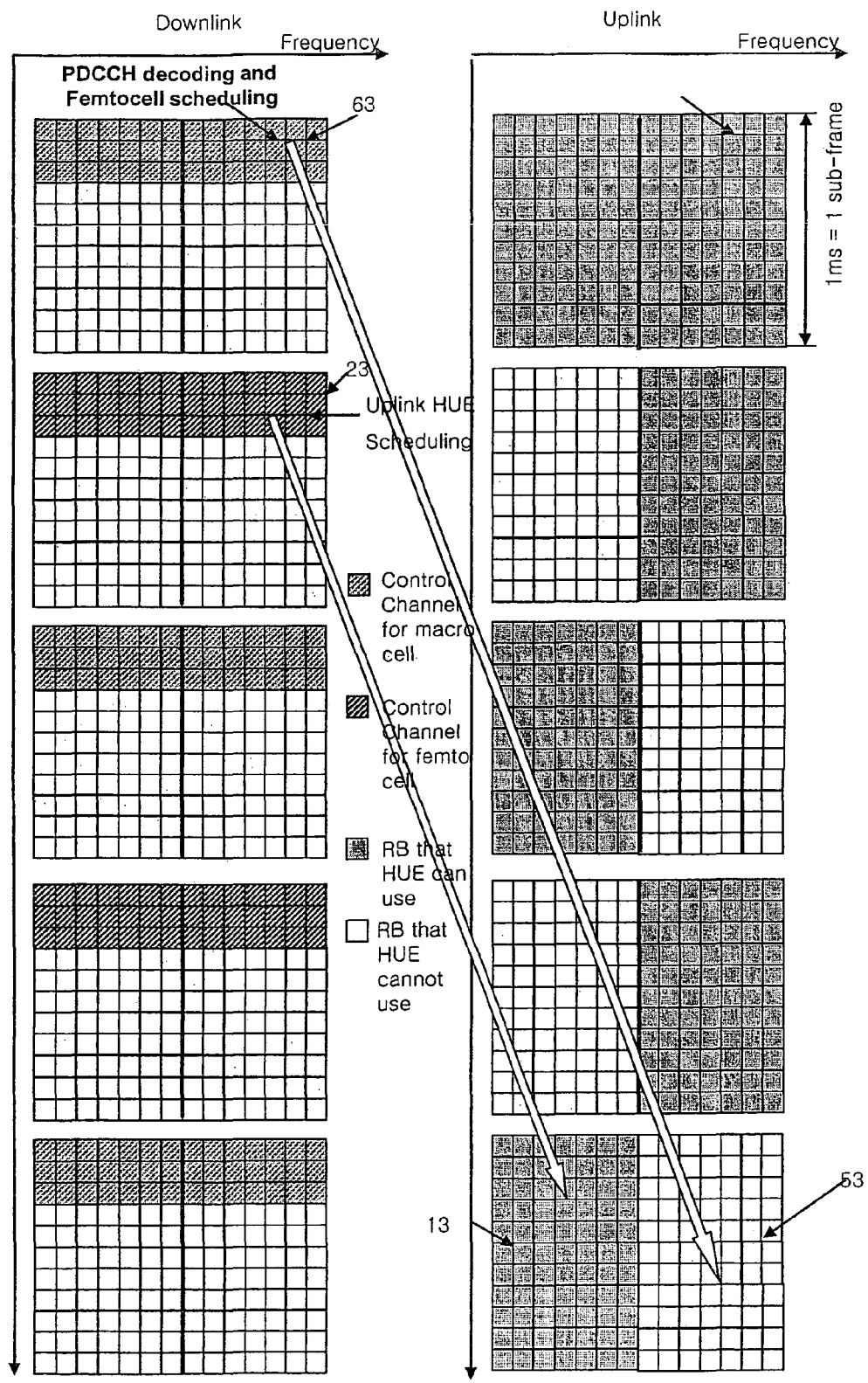
FIG. 11 illustrates a modification of femto BS's allocation of uplink by avoiding interference with the macro BS according to the first exemplary embodiment of the present invention.

FIG. 11 illustrates a modification of femto BS's allocation of uplink by avoiding interference with the macro BS according to the first exemplary embodiment of the present invention.

In general, the femto UE 10 transmits data in a burst manner in uplink, so the femto BS 20 does not need to allocate resource at every subframe. Instead, the femto BS 20 may intermittently allocate uplink radio resource for the femto UE 10. For example, the femto BS 20 may allocate uplink radio resource at a particular subframe period, e.g., at every two subframes or at every three frames.

Unlike the case as shown in FIG. 10, in FIG. 11, the femto BS 20 transmits the control channel, e.g., the PDCCH, including the information about the allocated uplink radio resource 13 on first one or more slots 23 of the subsequent frame.

In this case, the first one or more slots 23 of the subsequent subframe are originally supposed to carry the control channel, e.g., the PDCCH, of the macro BS 60, but the femto BS 20 does not receive the control channel of the macro BS 60. The reason is because, as described above, the femto UE 10 transmits data in a burst manner, so the femto BS 20 does not need to decode the control channel of the macro BS 60 at every subframe and allocate its resource to every subframe.

Instead, the femto BS 20 receives the control channel from the macro BS 60 on the first one or more slots 63 of the first subframe, and then transmits the control channel including the information about the uplink radio resource 13, which has been allocated to the femto UE 10, on the first one or more slots 23 of the second subframe.

Figure 12:
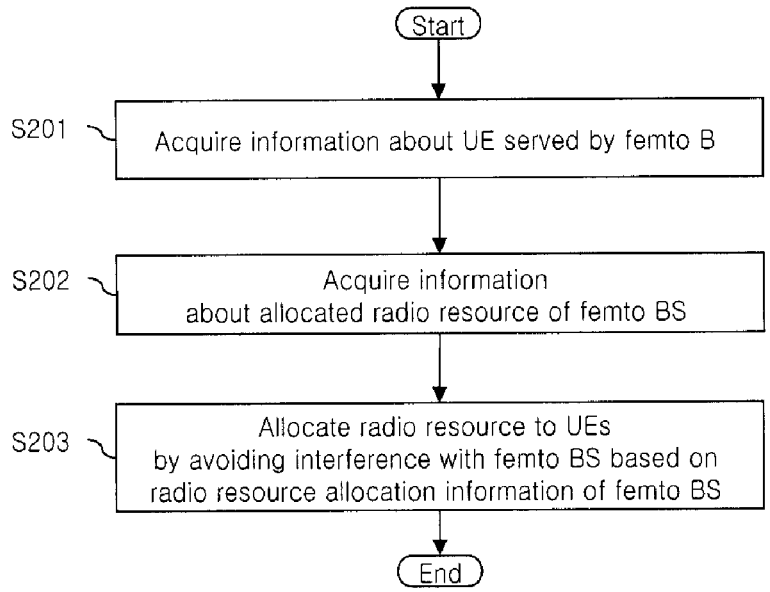
FIG. 12 is a flow chart illustrating the process of allocating, by the femto BS, resource by avoiding interference with the macro BS according to a second exemplary embodiment of the present invention.

FIG. 12 is a flow chart illustrating the process of allocating, by the femto BS, resource by avoiding interference with the macro BS according to a second exemplary embodiment of the present invention.

As noted with reference to FIG. 12, unlike the first exemplary embodiment of the present invention, in the second exemplary embodiment of the present invention, the macro BS 60 acquires information about radio resource allocated by the femto BS 20, allocates resource such that it does not overlap with radio resource of the femto BS 20.

This will now be described in detail.

1) The macro BS 60 acquires information, e.g., identification information, about one or more UEs served by the femto BS 20 (S201). In this case, the one or more UEs may be located also within a cell coverage of the macro BS 60.

In this case, the information about one or more UEs may be received from the femto BS 20 via the gateway 30. Or, as mentioned above, a control signal such as the SRS or the CQI transmitted by the one or more UEs may be received, from which information about the one or more UEs may be acquired.

The macro BS 60 can recognize whether or not the femto BS 20 exists near the macro BS 60 as follows. UEs located within the cell coverage of the macro BS 60 receive reference signals or control signals from the nearby femto BSs 20, makes a list of the adjacent femto BSs 20, and transmits the corresponding information to the macro BS 60.

2) Subsequently, the macro BS 60 acquires radio resource information which has been allocated to the one or more UEs served by the macro BS 60 (S202). The radio resource information may be received from the femto BS 20 via the gateway 30. Or, as mentioned above, the macro BS 60 may receive and decode the control channel, e.g., the PDCCH, transmitted from the femto BS 20 to acquire the radio resource information.

3) Subsequently, the macro BS 60 allocates radio resource to its UEs such that it does not overlap with the radio resource from the femto BS 20 (S203). In this case, the UE which should not overlap with the radio resource from the femto BS 20 may be a UE located within the cell coverage of the macro BS 60 and the cell coverage of the femto BS 20.

The second exemplary embodiment of the present invention is similar to the first exemplary embodiment as described above, so content of the first exemplary embodiment will be applied correspondingly as it is without any further explanation.

Figure 13:
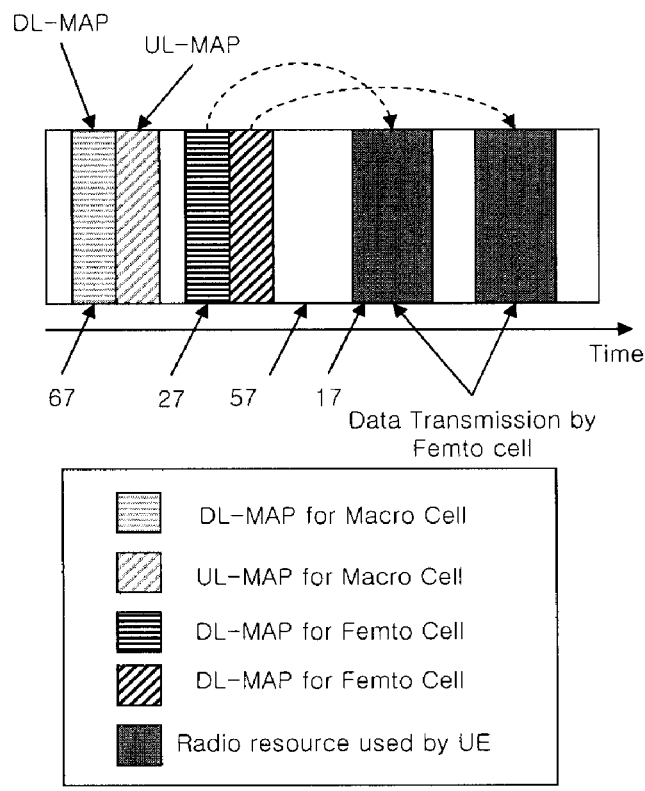
FIG. 13 illustrates application of the exemplary embodiments of the present invention to an IEEE 802.16 system.

FIG. 13 illustrates application of the exemplary embodiments of the present invention to an IEEE 802.16 system; and The first and second exemplary embodiments of the present invention as described above can be applicable to an IEEE 802.16 system (WiMax, WiBro).

As illustrated, in case of the IEEE 802.16 system, the macro BS transmits control information called a DL-MAP and a UL-MAP when each subframe starts.

The DL-MAP includes the information about the radio resource which has been allocated to each UE, and the UL-MAP includes information about subframes on which resource allocation is performed in addition to the information about the allocated radio resource. Namely, the UL-MAP includes resource allocation information about a corresponding frame or a frame upon skipping a certain number of frames.

The method of applying the first and second exemplary embodiments of the present invention to the IEEE 802.16 system will now be described briefly.

Each femto BS discriminates a macro UE which undergoes an interference with each corresponding femto BS, and recognizes identification information of the macro UE. To this end, each femto BS receives Sounding Signal, CQICH, ACKCH, and the like, transmitted from the macro UE, through which each femto BS recognizes the identification information of the UE.

The femto BS recognizes resource allocation information of the macro BS. To this end, each femto BS decodes a DL-MAP 67 and a UL-MAP transmitted by the macro BS by using the identification information of the UEs and recognizes information, e.g., time or frequency, about the radio resource 57 allocated to the UEs.

The femto BS allocates the resource 17 such that an interference with the radio resource 57 of the macro BS is minimized, and transmits information about the allocated radio resource via the DL-MAP 27.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor such as a microprocessor, a controller, a microcontroller an application specific integrated circuit (ASIC).

Figure 14:
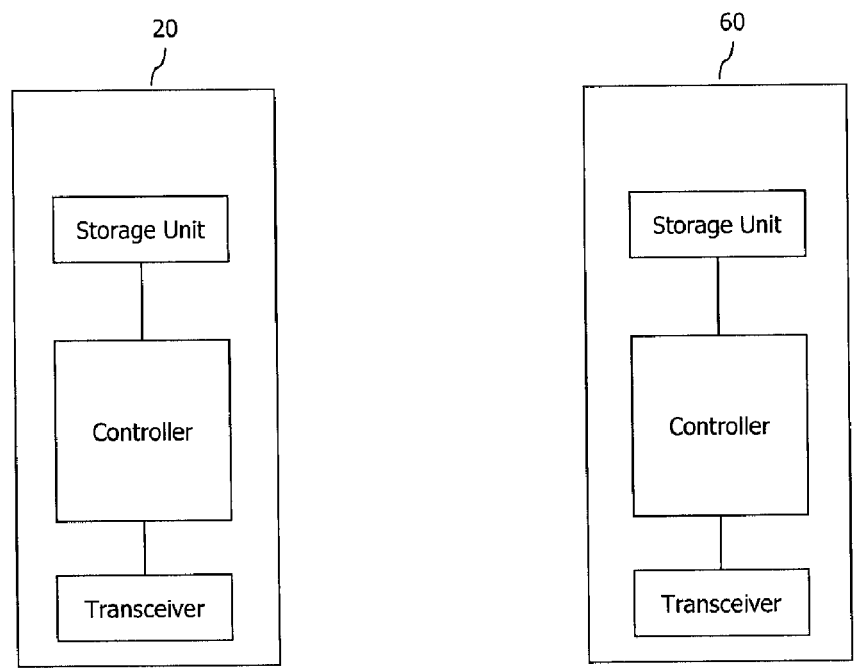
FIG. 14 is a schematic block diagram of a femto BS 20 and a macro BS 60 according to an exemplary embodiment of the present invention.

FIG. 14 is a schematic block diagram of a femto BS 20 and a macro BS 60 according to an exemplary embodiment of the present invention.

As shown in FIG. 14, the femto BS 20 and the macro BS 60 include a storage unit, a controller, and a transmission/reception unit, respectively.

The storage units store the methods illustrated in FIGS. 6 to 13.

Each controller controls the storage units and the transmission/reception units. In detail, the controllers execute the methods stored in the storage units. Also, the controllers transmit the above-mentioned signals via the transmission/reception units.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for allocating radio resource to one or more first user equipments (UEs) by a femto base station (BS), the method:
    acquiring information about one or more second UEs which are located within a cell coverage of the femto BS but receive a service by the macro BS;
    receiving a control channel from the macro BS;
    acquiring radio resource information allocated to the second UEs by the macro BS from the control channel; and
    allocating radio resource to the first UEs such that the allocated radio resource does not overlap with radio resource information allocated to the second UEs.

2. The method of claim 1, the acquiring of the information about the second UEs comprises:
    receiving control signals transmitted from the second UEs; and
    acquiring information about the second UEs by using the control signals.

3. The method of claim 2, wherein the acquiring of the information about the second UEs comprises:
    reading the positions and a period of the control signals on the radio frame;
    transmitting the position and a period information on the radio frame to a network entity; and
    receiving information about the second UEs corresponding to the positions and period on the radio frame from the network entity.

4. The method of claim 2, wherein the acquiring of the information about the second UEs comprises:
    reading the positions and periodicity of the control signals on the radio frame;
    comparing the positions and periodicity of the control signals with a pre-stored information on positions and periodicity from the network entity thereby to acquire the information.

5. The method of claim 4, wherein further comprising acquiring the pre-stored information about macro UE control signals from network entities before the macro UE is not detected or when the macro UE is detected.

6. The method of claim 3, wherein the network entity comprises one or more of a core network, a radio network controller (RNC), a femto gateway, a mobility management entity (MME), and a serving gateway (S-GW).

7. The method of claim 2, wherein the control signals comprises one or more of a sounding reference signal (SRS), a channel quality indicator (CQI), CQICH, ACKCH, a ranging channel, a PUCCH (Physical Uplink Control Channel)), and a control channel.

8. The method of claim 1, wherein the control channel comprises one or more of a PDCCH (Physical Downlink Control Channel), DL-MAP, and UL-MAP.

9. The method of claim 1, wherein the acquiring of the radio resource information comprises:
    decoding the control channel by using the information about the second UEs.

10. The method of claim 1, wherein, in allocating radio resource to the first UEs, one or more of uplink and downlink radio resources are allocated to the first UEs.

11. The method of claim 1, wherein the allocating of radio resource to the first UEs comprises:
    transmitting a control channel including information about the radio resource allocated to the first UEs;
    wherein the control channel is separated by certain slots, certain sub-frames or certain frames from a control channel of the macro BS, and transmitted.

12. A femto base station (BS) located in a cell coverage of a macro BS, the femto BS comprising:
    a transmission/reception unit configured to acquire information about one or more second user equipments (UEs) which are located within a cell coverage of the femto BS but receive a service by the macro BS, receive a control channel from the macro BS, and acquire radio resource information allocated to the second UEs by the macro BS from the control channel; and
    a controller configured to allocate radio resource to the first UEs such that the allocated radio resource does not overlap with radio resource information allocated to the second UEs.

13. The femto BS of claim 12, wherein the transmission/reception unit receives control signals fro the second UEs and acquires information about the second UEs.

14. The femto BS of claim 13, wherein the controller reads positions of the control signal on a radio frame, and receives information about the second UEs corresponding to the positions on the radio frame from a network entity via the transmission/reception unit.

* * * * *